H. PAULING.
PROCESS OF DEHYDRATING NITRIC ACID AND OTHER VAPORS.
APPLICATION FILED APR. 4, 1911.
993,868.
Patented May 30, 1911.
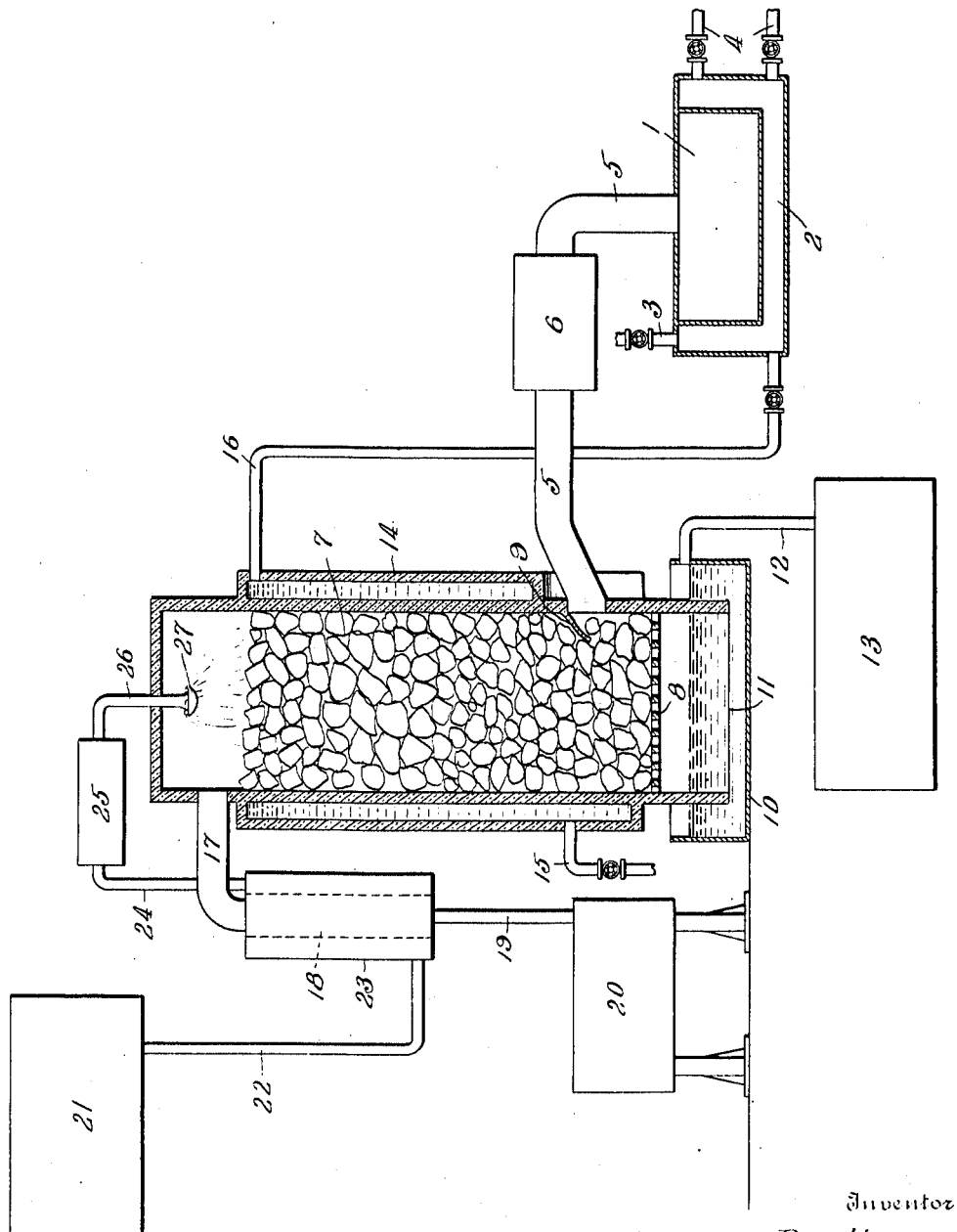
Witnesses
H. C. Rohnette
H. Schoenthal
Inventor
Harry Pauling
By Massie & McElroy
his Attorneys

UNITED STATES PATENT OFFICE.

HARRY PAULING, OF GELSENKIRCHEN, GERMANY, ASSIGNOR TO SALPETERSÄURE-INDUSTRIE-GESELLSCHAFT, G. M. B. H., OF GELSENKIRCHEN, GERMANY.

PROCESS OF DEHYDRATING NITRIC-ACID AND OTHER VAPORS.

993,868. Specification of Letters Patent. Patented May 30, 1911.

Application filed April 4, 1911. Serial No. 618,842.

*To all whom it may concern:*

Be it known that I, HARRY PAULING, a subject of the King of Prussia, residing at Gelsenkirchen, in the Kingdom of Prussia and German Empire, have invented a new and useful Improved Process of Dehydrating Nitric-Acid and other Vapors, of which the following is a specification.

This invention relates to processes of drying gases or vapors such as nitric acid vapors; and it comprises a process wherein vapors comprising a valuable constituent mixed with more or less moisture are caused to travel in contact with a drying agent which may if desired be caused to travel in the opposite direction to that of the vapors, the temperature of the drying agent being so regulated and controlled during the process as not to differ widely at any stage of the drying from the temperature of the medium being dried, whereby such valuable constituent is obtained in a highly concentrated and substantially dry condition; all as more fully hereinafter set forth and as claimed.

In concentrating more or less dilute solutions, such as nitric acid solutions, it is common to bring such solutions into contact in one way or another with a dehydrating agent, which, while taking up water with avidity, is practically inert chemically as regards its conduct toward the constituent which it is sought to recover. It is of course desirable to effect a concentration of the solution in such a way that the valuable component or components may be obtained as nearly free as possible both from moisture and from the dehydrating agent employed; while on the other hand the dehydrating agent should not retain any of the valuable component sought. Many methods of accomplishing these ends have been proposed but the results obtained leave much to be desired.

In the concentration of dilute solutions of nitric acid it is common to use strong sulfuric acid as the drying agent. According to one method it is proposed to mix dilute nitric acid with a suitable amount of concentrated sulfuric acid, and distil high per cent. nitric acid from the mixture. In order to obtain nitric acid of the desired high concentration by this method however, the amount of highly concentrated sulfuric acid required is excessive; for the reason that the quantity of water removed from the nitric acid must be relatively small as compared to the quantity of sulfuric acid used, if the latter is to retain its dehydrating properties to a sufficient degree during the distillation. Another method proposed is to pass the mixture of nitric and sulfuric acids through a column still which is externally heated; but in this process all of the acid is not obtained in concentrated form, and the separation of nitric acid from the mixture is incomplete. It has also been proposed to concentrate nitric acid by passing vapors of dilute nitric acid in contact with sulfuric acid flowing in a direction opposite to the passage of the vapors. Such methods are described for example in German Patents 82,573 (corresponding to U. S. Patent 517,098) to Frasch, and 144,633 to Valentiner and Schwarz. While these processes are perhaps as successful as any heretofore suggested, for various reasons they do not give quantitative yields and are otherwise unsatisfactory. One defect common to these processes is that they do not provide the proper adjustment of the temperatures of the drying agent and the medium being dried at the various stages of the process.

In processes heretofore known wherein gases or vapors are dried according to the counter-current principle, the gases may be passed through a suitable apparatus against a counter-current of the drying medium. The freshest drying medium is presented to the driest vapors, while the most nearly exhausted drying medium meets the incoming stream of gases laden with moisture. In the absorption of water by the drying agent there is ordinarily considerable development of heat, the amount of heat developed in a given case depending upon the particular agent used. As the absorption of moisture continues, the heat developed thereby may easily raise the temperature of the diluted drying agent to the point where it gives off water faster than it absorbs it, and in such case the drying agent ceases to function as such, and instead, actually adds moisture to the gases which it is desired to dry. This of course results in incomplete drying of the gases and general inefficiency of operation. For example, in drying 1 kilogram of the vapor of 60 per cent. nitric acid by 3 kilograms of 80 per cent. sulfuric acid, about 300 calories of heat are liberated, and this quantity of heat is sufficient to raise the temperature of the sulfuric acid something like 200° C. Assuming that the sulfuric acid is supplied to the drying apparatus at say 90° C. and that there is no provision for cooling it, then the temperature which the sulfuric acid would tend to attain at the end of the drying operation would be 290° C. But 290° C. is approximately the boiling point of 95 per cent. sulfuric acid, and hence acid of 80 per cent. or less strength would part with its absorbed water very rapidly in approaching such a temperature. In other words it would no longer be a drying agent, but would have exactly the opposite effect, giving up to the incoming nitric acid vapors, water which it had absorbed earlier in its progress.

I have discovered that, in drying gases or vapors according to the counter-current principle, by suitably controlling the temperatures throughout the process so that at no stage do the temperatures of the body of traveling vapors and the oppositely moving drying agent vary widely from each other, it is possible to obtain a more nearly quantitative yield and a higher purity of concentrate than has heretofore been possible. I may employ any convenient drying agent, though in practice sulfuric acid is most convenient. Other liquid and even solid drying agents may be used, various polysulfates in solid form being suitable under certain conditions, as well as molten phosphorus pentoxid, nitrates, and the like. Ordinarily however these other drying mediums are not preferable to sulfuric acid. The new process is applicable in general to drying all gases and vapors in which a condensation of one or more constituent parts is possible. For purposes of illustration the application of the present process to the production of concentrated nitric acid from dilute nitric acid will be hereinafter described.

In concentrating nitric acid according to the present process, vapors of dilute nitric acid are introduced into the vapor inlet of a suitable drying apparatus, and pass therethrough against a counter-current of sulfuric acid, the dried nitric acid vapors finally emerging from the vapor outlet of the apparatus. The sulfuric acid is best preheated to a temperature not far from that at which the dried nitric acid vapors leave the apparatus, and is then introduced into the apparatus at a point near where the dry vapors emerge. Most advantageously this preheating should be carried to a point somewhat in excess of the temperature of the emerging dried nitric acid vapors, condensation of the latter being thus avoided. It is best in any event to preheat to at least the temperature of the outgoing vapors.

As the sulfuric acid flows through the drying apparatus against the current of vapors and absorbs moisture therefrom, its temperature tends, of course, to rise due to the heat evolved during the absorption. As before explained, this rise of temperature is disadvantageous since it reduces, and eventually destroys, the drying effect of the sulfuric acid. I obviate this disadvantage however by cooling the drying acid during its progress in such a way as to prevent its temperature becoming much higher at any stage of the process than that of the vapors at the same stage. By thus cooling the sulfuric acid, its drying effect is maintained at as nearly a maximum as is practicable at each stage of the process, while at the same time the cooling is not carried so far as to cause condensation and consequent absorption of the nitric acid. This adjustment of the temperatures thus permits the most efficient utilization of the drying power of the sulfuric acid at every stage throughout the whole drying process, and results in the maximum quantitative yield of concentrated nitric acid being obtained. Furthermore, the sulfuric acid finally leaves the drying apparatus substantially free from nitric acid.

In a specific embodiment of the present process I may dry nitric acid of 50 to 60 per cent. strength which is commonly employed in practice for the manufacture of a highly concentrated nitric acid. The saturated vapors of acid of this strength, containing from 50 to 40 per cent. water vapor, have, at the most, a temperature of about 120° C. The vapors are best introduced into the drying apparatus at a temperature somewhat above this; that is, they are superheated to a slight extent. Where it is intended to produce very highly concentrated nitric acid, the sulfuric acid should be preheated to about 90° C., somewhat above the boiling point of 100 per cent. nitric acid, before being led into contact with the nearly dry nitric acid vapors emerging from the drying apparatus. Cooling means suitably disposed in the apparatus regulate the temperature of the sulfuric acid in its progress therethrough and prevent such temperature from exceeding that of the counterflowing vapors at any point. For most favorable results under the conditions above given, the temperature of the sulfuric acid at the end of its drying course, i. e. at the point of introducing the dilute acid vapors, should not much exceed 130° C. At this temperature there is practically no condensation of the nitric acid, while the drying effect of the sulfuric acid is utilized to the fullest extent.

In the accompanying drawings, I have shown diagrammatically an assemblage of apparatus elements suitable for use in the process of the present invention. In this showing the figure is an elevation, partly in section, of an acid drying plant.

1 is a suitable container for nitric acid having suitable heating means such as jacket 2 provided with steam inlet 3 and drain pipes 4. Vapor conduit 5 leading from the top of the container passes through superheater 6 of any suitable type, and enters the lower part of drying tube or column 6 containing fragments 7 of acid-proof material such as pumice, broken pottery or the like suitably supported as at 8. The column may be constructed of quartz glass, stoneware, neutral iron, or other suitable material not attacked by the acids employed. A protective shield or hood 9 may be conveniently located over the entrance of the vapor conduit. Vessel 10, when containing liquid, seals the base 11 of the column and may be provided with a pipe 12 or other convenient discharge means leading to tank 13 containing the spent drying medium. The column for a part of its length is provided with cooling jacket 14 having an inlet pipe 15 and an outlet pipe 16 for circulation of a cooling medium. The outlet pipe may conveniently discharge into the heating jacket (2), as shown. Vapor exit pipe 17 leaves the column near its top and leads to condenser 18. Pipe 19 conveys the condensate into receiver 20. From reservoir 21, pipe 22 conveys the drying agent to the condenser jacket 23, while pipe 24 connects the jacket with heater 25 of any desired type. From the heater, the drying agent passes through pipe 26 and liquid distributing device 27 into the upper part of the drying column.

The method of employing the apparatus in the present process is obvious from the foregoing description. The nitric acid to be dried is vaporized in 1, passes through conduit 5 to the distilling column, being superheated in 6 to the desired temperature, and enters the column at a point near its base. The vapors pass upwardly through the mass of inert filling material in the column meeting the sulfuric acid flowing downward, and are dried thereby, leaving the column at the top by conduit 17. The hot dry vapors of nitric acid pass through condenser 18 where they give up heat to the sulfuric acid supplied from reservoir 21 by pipe 22 to jacket 23, and are thereby condensed, the condensate of highly concentrated nitric acid flowing through pipe 19 into receiver 20 from which it may be removed as desired. The sulfuric acid supplied from the reservoir and flowing through jacket 23 is heated considerably by the hot vapors condensed in the worm. Emerging from the jacket by pipe 24, the warm sulfuric acid passes through heater 25 where it is further heated to the required temperature, and thence into the top of the column where it is distributed over the filling material and trickles down therethrough against the upwardly flowing current of nitric acid vapors from which it abstracts moisture. Undue rise of the temperature of the sulfuric acid is obviated by circulating a cooling medium, such as water, through cooling jacket 14, the cooling effect being best adjusted, as before stated, in such a manner that at no point in the column shall the temperature of the drying medium greatly exceed that of the nitric acid vapors at the same point. The sulfuric acid having passed through the entire length of the column collects in vessel 11, forming a seal around the depending edges of the column and preventing access of the external air. Acid in excess of that necessary to maintain the seal is withdrawn through pipe 12 and led into tank 13 from which it may be removed as desired for reconcentration. The heat removed by the cooling water from the sulfuric acid in its passage through the column may be utilized in any convenient way. Very advantageously such heat is utilized in vaporizing the dilute nitric acid or other material to be dried: for which purpose the hot jacket water may be conducted by pipe 16 to heating jacket 2, auxiliary heating means being provided to be used when necessary, as indicated by the drawing.

The process may of course be carried out in many other forms of apparatus besides the one described above, the particular type here shown being merely for purposes of illustration.

What I claim is:—

1. The process of drying gases or vapors, which comprises passing a current of such vapors against a counter-current of a drying agent to secure substantially complete dehydration of such vapors, and controlling the temperature of said drying agent in such a manner that at no stage of the process does the temperature of the drying agent differ widely from that of the said vapors at the same stage.

2. The process of drying gases or vapors, which comprises passing a current of such vapors against a counter-current of a drying agent, and cooling said drying agent in such a manner that at no stage of the process does the temperature of the drying medium considerably exceed that of the vapors at the same stage.

3. The process of drying gases or vapors, which comprises passing a current of such vapors against a counter-current of a drying agent, said drying agent being preheated before use to a temperature at least equal to that of the dried vapors passing off, and controlling the temperature of said drying agent in such a manner that at no stage of the process does the temperature of the drying agent differ widely from that of the said vapors at the same stage.

4. The process of drying gases or vapors, which comprises passing a current of such vapors against a counter-current of a drying agent, said drying agent being preheated before use to a temperature at least equal to that of the dried vapors passing off, and cooling said drying agent in such a manner that at no stage of the process does the temperature of the drying agent differ widely from that of the said vapors at the same stage.

5. The process of concentrating nitric acid, which comprises passing vapors of nitric acid containing moisture against a counter-current of a drying agent to dry said vapors, and controlling the temperature of said drying agent during such passage in such a manner that at no stage does the temperature of said drying agent differ greatly from that of the said vapors at the same stage.

6. The process of concentrating nitric acid, which comprises passing vapors of relatively dilute nitric acid against a counter-current of sulfuric acid to dry said vapors, and cooling the sulfuric acid during such passage in such a manner that at no stage does its temperature greatly exceed that of the said vapors at the same stage.

7. The process of concentrating nitric acid, which comprises producing vapors of relatively dilute nitric acid, passing said vapors into one end of a suitable drying apparatus and causing them to travel therethrough, preheating sulfuric acid to a temperature at least equal to that of the dried vapors which it is desired to obtain, introducing said sulfuric acid at the other end of said drying apparatus and causing it to travel therethrough in a direction opposite to that of the vapors to be dried, and cooling said sulfuric acid during its progress through said apparatus in such a manner that its temperature never greatly exceeds that of the vapors with which it is in contact.

8. The process of concentrating nitric acid, which comprises producing vapors of relatively dilute nitric acid, passing said vapors into one end of a suitable drying apparatus and causing them to travel therethrough, preheating sulfuric acid to a temperature at least equal to that of the dried vapors which it is desired to obtain, introducing said sulfuric acid at the other end of said drying apparatus and causing it to travel therethrough in a direction opposite to that of the vapors to be dried, cooling said sulfuric acid during its progress through said apparatus in such a manner that its temperature never greatly exceeds that of the vapors with which it is in contact, and utilizing the heat taken from the sulfuric acid to vaporize the nitric acid to be dried.

9. The process of drying gases or vapors, which comprises passing a current of such vapors against a counter-current of a drying agent, cooling said drying agent in such a manner that at no stage of the process does the temperature of the drying medium considerably exceed that of the vapors at the same stage, and utilizing the heat taken from the said drying agent to generate the vapors to be dried.

In testimony whereof I have signed my name to this specification in the presence of two subscribing witnesses.

HARRY PAULING.

Witnesses:
RICHARD DIERKEL,
LOUIS VANDORY.